(12) United States Patent
Strohbach et al.

(10) Patent No.: US 9,342,361 B2
(45) Date of Patent: May 17, 2016

(54) METHOD AND SYSTEM FOR CONTROLLING PHYSICAL ACTUATORS IN PERVASIVE COMPUTING ENVIRONMENTS

(75) Inventors: Martin Strohbach, Schriesheim (DE); Erno Kovacs, Stuttgart (DE); Stefan Gessler, Karlsruhe (DE)

(73) Assignee: NEC EUROPE LTD., Heidelberg (DE)

( * ) Notice: Subject to any disclaimer, the term of this patent is extended or adjusted under 35 U.S.C. 154(b) by 752 days.

(21) Appl. No.: 13/390,964

(22) PCT Filed: Aug. 16, 2010

(86) PCT No.: PCT/EP2010/005015
§ 371 (c)(1),
(2), (4) Date: Apr. 3, 2012

(87) PCT Pub. No.: WO2011/020587
PCT Pub. Date: Feb. 24, 2011

(65) Prior Publication Data
US 2012/0185100 A1    Jul. 19, 2012

(30) Foreign Application Priority Data
Aug. 18, 2009 (EP) .................................. 09010611

(51) Int. Cl.
*G05B 21/00* (2006.01)
*G05B 13/00* (2006.01)
(Continued)

(52) U.S. Cl.
CPC ........ *G06F 9/5027* (2013.01); *G05B 19/41865* (2013.01); *H04L 67/12* (2013.01); *G05B 2219/32328* (2013.01); *G06F 2209/5015* (2013.01)

(58) Field of Classification Search
USPC ........................................................ 700/275
See application file for complete search history.

(56) References Cited

U.S. PATENT DOCUMENTS 7,430,186 B1     9/2008 Kim
2007/0236346 A1* 10/2007 Helal et al. ............... 340/539.22
2010/0011340 A1*  1/2010 Pandey ........................ 717/107

FOREIGN PATENT DOCUMENTS

JP    2009176141 A    8/2009
WO   2008/135459     11/2008

OTHER PUBLICATIONS

Japanese Office Action dated Mar. 12, 2013, from corresponding JP application.
(Continued)

*Primary Examiner* — Mohammad Ali
*Assistant Examiner* — Md Azad
(74) *Attorney, Agent, or Firm* — Young & Thompson

(57) ABSTRACT

For achieving a coordinated and opportunistic actuator control a method for controlling physical actuators in pervasive computing environments is claimed, wherein an entity—actuation space—is provided, the actuation space being configured to manage actuation requests and actuation status information, wherein at least one resource user sends one or more actuation requests to the actuation space that stores the one or more actuation requests, wherein at least one actuator resource controls at least one physical actuator on the basis of one or more of the actuation requests stored in the actuation space, wherein the at least one actuator resource sends actuation status information corresponding to one or more of the actuation requests to the actuation space, and wherein the at least one resource user and the at least one actuator resource share the actuation space. Furthermore, a corresponding system is disclosed.

31 Claims, 9 Drawing Sheets

Figure 1:
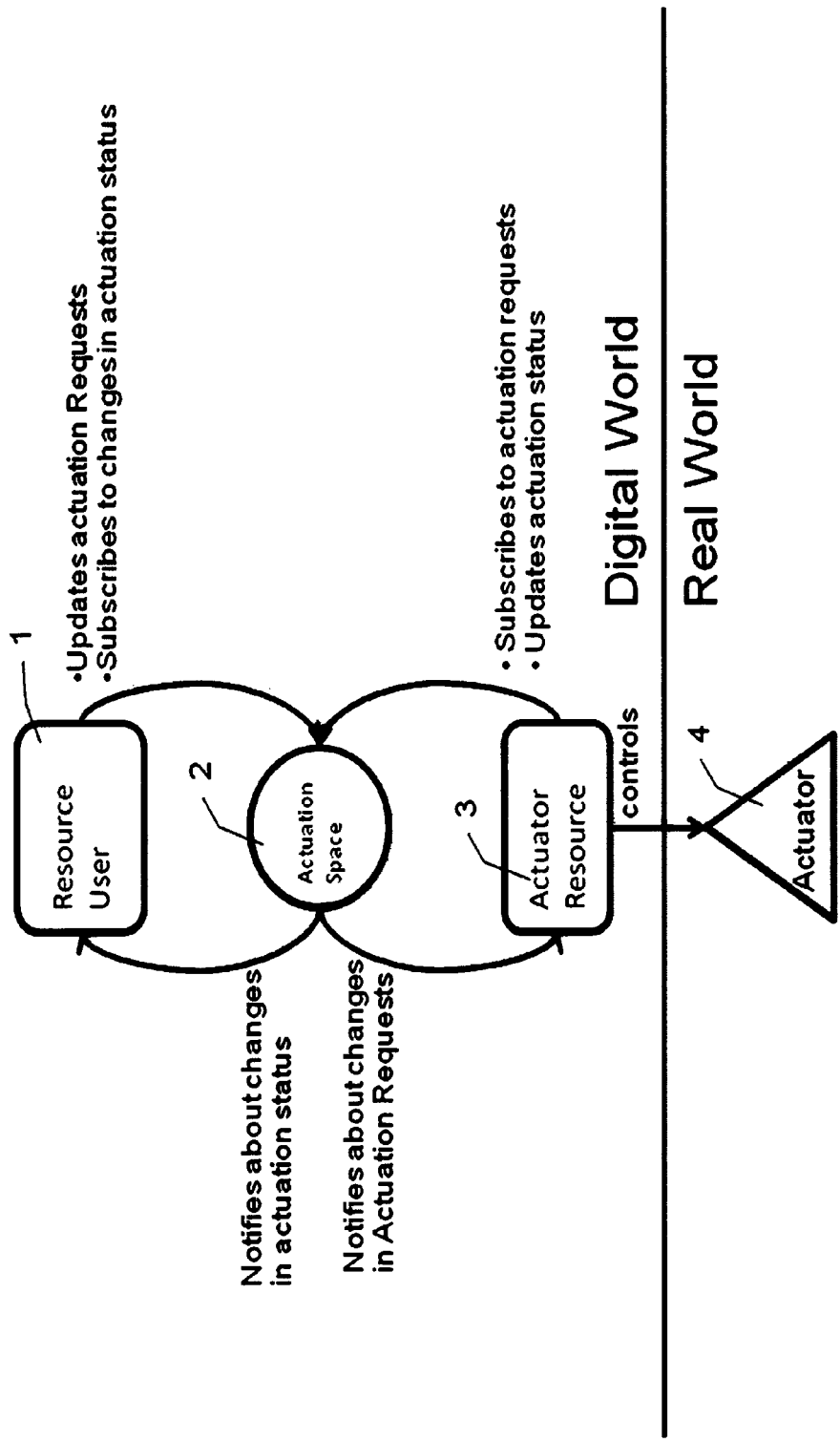

(51) Int. Cl.
*G05B 15/00* (2006.01)
*G05D 9/00* (2006.01)
*G05D 23/00* (2006.01)
*G06F 3/01* (2006.01)
*G08B 1/08* (2006.01)
*G06F 9/50* (2006.01)
*G05B 19/418* (2006.01)
*H04L 29/08* (2006.01)

(56) References Cited

OTHER PUBLICATIONS

Yutaka Arakawa et al, "Evaluation of Dynamic Scaling Method for Real-World Data Sharing Mechanism", IEICE Technical Report, vol. 109, No. 79, Japan, The Institute of Electronics, Information and Communication Engineers, Jul. 15, 2009 (the translation of relevant portions thereof is attached).

International Search Report dated Nov. 19, 2010, corresponding to PCT/EP2010/005015.
F. Dressler, et al.; "A rule-based system for programming self-organized sensor and actor networks"; Computer Networks; vol. 53, No. 10; pp. 1737-1750; Jul. 14, 2009.
Luciana Moreira Sa De Souza, et al.; "A web Service Based Shop Floor Integration Infrastructure"; vol. 4952; pp. 50-67; 2008.
Christian Brecher et al.; "Agentenbasierte Ablaufsteuerung-Projektierbares Multiagentensystem fur die Ablaufsteuerung in der automatisierten Fertigung"; vol. 47, No. 11; pp. 46-54; Nov. 1, 2005.
Saigou, Tomozumi, "Remote Control of Household Electrical Appliances Using T-Engine", Personal Media Corporation, Ironware, 2004, vol. 90.
Paolo Costa et al.: "TeenyLIME: Transiently Shared Tuple Space Middleware for Wireless Sensor Networks", MidSens'06, Nov. 27-Dec. 1, 2006 Melbourne, Australia.
Nanyan Jiang et al.: "Enabling Applications in Sensor-based Pervasive Environments", The Applied Software Systems Laboratory Department of Electrical and Computer Engineering Rutgers University, Piscataway NJ 08855, USA.

* cited by examiner

METHOD AND SYSTEM FOR CONTROLLING PHYSICAL ACTUATORS IN PERVASIVE COMPUTING ENVIRONMENTS

The present invention relates to a method for controlling physical actuators in pervasive computing environments. Furthermore, the invention relates to a system for controlling physical actuators in pervasive computing environments.

Pervasive computing environments are characterized by their dependency on knowledge about the physical world, large scale, openness, heterogeneity and/or the ability to adapt to changes in the physical world. Pervasive computing environments change and/or affect the real world, for example changing the temperature, moving objects, sounding an alert, displaying an image, etc. In doing so, changes in the real world are typically performed by actuators, e.g. thermostats, heating/cooling elements, servo-motors, vibrating elements, speakers, electronic displays, etc. Generally, controlling units or applications often need to access the same actuator which may lead to potential conflicts. This is in particular a problem for long term actuation tasks, e.g. for keeping the temperature of a room to a certain defined level.

In addition pervasive computing environments are characterized by highly dynamic ad-hoc interactions rather than pre-orchestrated composition of services. For instance a controlling entity may want to set the temperature of a room, but does not know how to contact or interact with the appropriate actuator. A physical actuator may even not be available, but should opportunistically be used when it becomes available without further involvement of the controlling entity.

Exemplarily it is referred to the Paper Nanyan Jiang et al., "*Enabling Applications in Sensor-based Pervasive Environments*", in *Proceedings of BaseNets '04*, San Jose, Calif., October 2004, describing the Meteor Programming Framework and its associated concepts which have been designed to support development of applications in such pervasive computing environments. The Paper discloses a programming model that enables opportunistic application flows in pervasive environments. The model builds on content-based discovery and routing services and defines associative rendezvous as an abstraction for content-based decoupled interactions. Cascading local behaviours then build on associative rendezvous to enable opportunistic application flows to emerge as a result of context and content based local behaviours. However, Meteor does not provide a concrete method for coordinated and opportunistic access to actuators.

Further, it is referred to the Paper Paolo Costa et al., "TeenyLIME: Transiently Shared Tuple Space Middleware for Wireless Sensor Networks", in Proceedings of the 1st ACM International Workshop on Middleware for Sensor Networks (MIDSENS—colocated with ACM/IFIP/USENIX Middleware), Melbourne (Australia), November 2006, describing a model which is based on tuple spaces as a programming middleware for wireless sensor networks. In TeenyLime capability tuples provide a powerful way to implement RPC (Remote Procedure Call) like behaviour that can be used to control actuators. Similar to Meteor the proposed method does not provide a solution for coordinating access to actuators.

It is therefore an object of the present invention to improve and further develop a method and a system of the initially described type for controlling physical actuators in pervasive computing environments in such a way that, by employing mechanisms that are readily to implement, a coordinated and opportunistic actuator control is achieved.

In accordance with the invention, the aforementioned object is accomplished by a method comprising the features of claim 1. According to this claim, a method for controlling physical actuators in pervasive computing environments is provided, wherein an entity—actuation space—is provided, said actuation space being configured to manage actuation requests and actuation status information, wherein at least one resource user sends one or more actuation requests to said actuation space that stores said one or more actuation requests, wherein at least one actuator resource controls at least one physical actuator on the basis of one or more of said actuation requests stored in said actuation space, wherein said at least one actuator resource sends actuation status information corresponding to one or more of said actuation requests to said actuation space, and wherein said at least one resource user and said at least one actuator resource share said actuation space.

Furthermore, the aforementioned object is accomplished by a system comprising the features of claim 35. According to this claim, a system for controlling physical actuators in pervasive computing environments is provided, the system comprising an entity—actuation space—being configured to manage actuation requests and actuation status information, at least one resource user being configured to send one or more actuation requests to said actuation space that stores said one or more actuation requests, at least one actuator resource being configured to control at least one physical actuator on the basis of one or more of said actuation requests stored in said actuation space, wherein said at least one actuator resource further being configured to send actuation status information corresponding to one or more of said actuation requests to said actuation space, and wherein said at least one resource user and said at least one actuator resource being configured to share said actuation space.

According to the invention it has first been recognized that in the context of controlling physical actuators in pervasive computing environments actuators can be controlled in a coordinated way by decoupling resource users, e.g. services that control directly or indirectly physical actuators, from actuator resources, e.g. entities that want to achieve a certain effect in the real world by using actuators. Further, it has been recognized that the decoupling of resource users and actuator resources is enabled by providing a control abstraction of physical actuators that is based on actuation requests and actuation status information. In fact, resource users do not need to communicate with actuator resources directly. More specifically, according to the invention, an entity—actuation space—is provided, the actuation space being configured to manage actuation requests and actuation status information. In doing so, at least one resource user can send one or more actuation requests to the actuation space that stores these one or more actuation requests and at least one actuator resource can control at least one physical actuator on the basis of one or more of these actuation requests stored in the actuation space. Moreover, the at least one actuator resource sends actuation status information corresponding to one or more of the actuation requests to the actuation space. Furthermore, the invention proposes the at least one resource user and the at least one actuator resource to share the actuation space.

Thus, the method and the system according to the present invention enable a coordinated and opportunistic actuator control and physical effects on dynamically changing environments can remain consistent over time.

Advantageously, the at least one resource user and the at least one actuator resource may be decoupled spatially and/or temporally by updating and accessing the shared actuation space. Thus, a resource user does not need to be collocated with an actuator resource. In fact, a resource user not even requires network connectivity. The resource user only requires network connectivity to the actuation space that is also accessible by the actuator resource. Moreover, resource users and actuator resources may be temporally decoupled as there is no direct temporal relationship between a resource user writing information in the actuation space and an actuator resource retrieving the information.

According to a preferred embodiment updates, insertions and/or deletions of actuation requests in the actuation space may be performed by the at least one resource user. In doing so, updates modify existing actuation requests stored in the actuation space, insertions add new actuation requests to the actuation space and deletions remove existing actuation requests from the actuation space.

According to a further preferred embodiment at least one resource user may monitor at least one of the actuation requests and/or actuation status information maintained in the actuation space. Independently of an actuation request, resource users may monitor to actuation information maintained in the actuation space for coordinated actuator control.

Advantageously, at least one actuator resource may monitor at least one of the actuation requests and/or actuation status information maintained in the actuation space. Actuator resources may monitor information in the actuation space by sending corresponding requests to the actuation space. These requests may contain a description of the actuation request and a flag indicating whether status information should be returned if available. It is noted that these requests may be temporally completely decoupled from the update of an actuation request. Thus, actuator resources can start monitoring the information long before any resource user actually requests an actuation task. This way a new actuation request can instantly be executed by an actuator resource. Likewise a newly deployed actuator resource may monitor the actuation space long after the resource user has requested an actuation request. By doing this, new actuators can dynamically be taken into account.

According to a preferred embodiment the monitoring of the actuation requests and/or actuation status information maintained in the actuation space may be performed by subscribing to the actuation requests and/or actuation status information. On the one hand, resource users can subscribe to information in the actuation space, and, on the other hand, actuator resources may subscribe to information in the actuation space.

According to a preferred embodiment the subscribing may be performed by sending subscription requests to the actuation space, wherein the subscription requests include a description of the actuation request and/or a flag indicating whether actuation status information is to be returned if available. As a result of the subscription an initial notification may be returned containing the actuation request and actuation status information if requested. The notification may be empty if there is no corresponding request.

Additionally or alternatively the monitoring of the actuation requests and/or actuation status information maintained in the actuation space may be performed by polling the actuation space, for example by sending queries to the actuation space.

According to a preferred embodiment the at least one resource user and the at least one actuator resource may be notified about changes in the actuation space by the actuation space or another entity being aware of changes in the actuation space. Thus, resource users and actuator resources may be up to date regarding actuation requests and/or actuation status information maintained in the actuation space.

Advantageously, it may be provided that the at least one actuator resource executes an actuation request after receiving a notification from the actuation space as a result of a change in the actuation space, in particular a change in an actuation request, that is performed by the at least one resource user. For example, the notification is a result of an update operation of a resource user.

With respect to coordination and conflict resolution, the at least one actuator resource may update the actuation requests and the corresponding actuation status information in the actuation space after the execution of the actuation requests. Advantageously, the actuation status information may be updated by actuator resources whenever there are relevant changes.

According to a specific embodiment the at least one or at least one actuator resource may be operational to function as resource user in order to indirectly control at least one physical actuator. Thus, actuator resources can act as a resource user for controlling physical actuators indirectly.

With regard to a high level abstraction for physical actuators and a dynamic mapping of concrete physical actuators, the actuation space may be implemented in a distributed fashion, in particular in a hierarchy of actuation subspaces that manage the actuation requests and actuation status information for different and/or predefined geographic areas. Thus, for instance, the actuation information for dedicated buildings can be managed by such actuation subspaces.

According to a preferred embodiment the actuation space may contain individual entries including an actuation request that specifies a request for a predefined actuator and actuation status information that provides information about the status of the actuation request. The actuation status information representing the status of an actuation request may be especially important for long lasting actuation requests, such as keeping the temperature to a predefined level, and for coordination and conflict resolution.

According to a specific embodiment the actuation requests may consist of actuation tasks and associated meta data that specify what physical effects should be achieved in a specified environment. Actuation tasks may be associated with the following meta data:

An actuator to which this information relates, this can either be a physical actuator or a real world entity (such as person, place, thing) to which the actuation relates.

a maximum error tolerance maximum time that specifies a future point in time at which the specified actuation result should be achieved a minimum time that specifies a future point in time before which the actuator should not be controlled in order to achieve the specified actuation effect spatial scope defining to which area the actuation tasks applies. This can be specified by a point, circle or polygons with 2 or 3D coordinates or as a symbolic location, e.g. room spatial tolerance defines the tolerance of a spatial scope, e.g. if an actuation specifies to raise the temperature in a room, it may also acceptable to raise the whole floor if the control systems does not support the corresponding granularity a network scope restricting the actuator resources to a network domain a list of actuator resources, restricting the set of actuator resource that should eventually execute the task a timeout that specifies when the actuation task and associated state information should be removed from the model resource an indicator that specifies whether the actuation task and associated state information should be stored in a history database Additionally, it may be provided that the actuation tasks can be classified according to different dimensions.

With regard to the classification of the actuation tasks, actuation tasks may be entity-based, wherein the entity-based actuation tasks specify actuation effects in relationship to a physical entity, for example a physical entity such as a room.

With regard to the classification of the actuation tasks, actuation tasks may be conditional, wherein the conditional actuation tasks employ event-based rules that determine when an actuation request should be executed.

According to a specific embodiment, the actuation tasks may contain temporal information about the planned and/or predefined time of execution.

Advantageously, it may be provided that the actuation tasks may contain permissible deviations, wherein the deviations include an error tolerance and/or a spatial tolerance.

With regard to the classification of the actuation tasks, actuation tasks may be composed, wherein the composed actuation tasks define temporal constraints and relationships between actuation tasks. Composed actuation tasks may define a temporal "is executed after" or "is executed in parallel" relationship between a set of actuation tasks. The "is executed after" relationship may be annotated with temporal constraints that define upper and lower boundaries that must be satisfied for the composed actuation task to complete successfully. An individual actuation task may depend on more than one actuation task. The composed actuation task defines whether predecessing tasks must both be fulfilled (logical AND) or only one of them must be fulfilled (OR relationship), combinations are also possible.

Actuations tasks may be entity-based, conditional and/or composed. Examples of actuation tasks are:
Simple Tasks
  Set speaker level of speaker to 10
  Set average speaker volume to 20 dB
  Turn on lights x,y and z
  Move Robot X to position (x,y)
  Robot X raise arm to position (x,y,z)
Entity-based actuation tasks
  Set temperature of room X to 20 degrees Celsius
  Maintain temperature room X to the level of 20 degrees Celsius until told otherwise/until time x/for a duration of time d
  Set brightness in room X to a maximum level
  Heat this room
Composed actuation tasks
  Turn on light in room X and after 5 minutes turn on heating in room x
  Turn on light in room X or turn on light of desk x [situated in room X]
  Boil the water and in parallel turn on the oven
Conditional Tasks
  If Bob is in room X then turn on light in room X
  If Bob is in room X then (for room x, turn on light and after 5 mins turn on heating)

According to a preferred embodiment the actuation status information corresponding to an actuation request may include—non-exclusive—a list of actuator resources that are taking care of the corresponding actuation request and the resource user or resource users that specified the actuation request. In doing this, it is possible that several resource users specify the same actuation request. The actuation status information is especially important for long lasting actuation requests, such as keeping the temperature to a predefined level, and for coordination and conflict resolution.

With respect to further optimization, it may be provided that the following non-exclusive elements are specified in the actuation status information per actuator resource that is taking care of the actuation request:
  Success or Failure indication, including a reason
  Planned time of execution
  Deviations from specified actuation task (e.g. actual error, spatial tolerance)
  Whether it is executed or already finished (for temporally restricted actuation tasks) or the degree (e.g. in time) to which it has finished
  Arbitrary human readable information
  Locks, for controlling access The actuation status information may be updated by actuator resources whenever there are relevant changes. Advantageously, after completion of an actuation task the actuation task and associated actuation information may be deleted, stored in a history database, or be maintained by the model resource for a predefined amount of time. These actions may happen either when the resource user retrieves or when a specified timeout in the actuation request occurs, but not before the specified timeout. If no timeout is specified by the resource user and it does not retrieve the status information, the information is removed after a system configurable timeout. The action, i.e. deletion or storing in database, depends on whether this was specified in the actuation task or not. It may be provided that the default behaviour is to delete the entry.

According to a preferred embodiment the information stored in the actuation space may be implemented with an entity-attribute based data model in which actuation tasks are specified in terms of effects on real-world entities, e.g. actuator, room, person, place, thing, light up a physical object, etc. The actuation task and actuation status information may be represented as different attributes of the entities.

In another embodiment the information stored in the actuation space may be implemented with a tuples data structure.

According to a specific embodiment multiple physical actuators may be controlled by monitoring a single actuation request of a resource user, wherein an actuator resource reacts to changes regarding the actuation request in the actuation space, wherein further actuation resources being deployed subscribe to the actuation request unbeknown to the resource user. By doing this, physical actuators are easily replaceable and the desired effect as specified in the actuation task can be maximized as new actuators are deployed at runtime without changing anything in the existing system. Thus, there may be no need to introduce composed actuators and new actuators can simply subscribe to the appropriate information maintained in the actuation space.

According to a specific embodiment multiple physical actuators may be controlled by composing actuator resources, wherein an actuation request originating from an resource user is received by an actuator resource having previously monitored the actuation request, wherein the actuator resource breaks down the actuation request in new separated actuation requests and inserts the new separated actuation requests in the actuation space, wherein further actuator resources are correspondingly notified to control their respective physical actuators according to the new separated actuation requests.

According to a specific embodiment an actuator resource may monitor an actuation request in the actuation space, wherein the actuator resource employs additional knowledge for making decisions about which physical actuator to control, wherein the additional knowledge is obtained from knowledge encapsulated in the physical actuators and/or by accessing an external system. External systems may be a sensing system, knowledge base or any other systems or third party services. Thus, a resource user is allowed to specify a high level actuation task that requires the dynamic selection of relevant actuators. The resource user can abstract from the concrete actuators as the actuation space decouples the resource users from concrete actuator resources that execute the actuation task.

Advantageously, the actuator resources may employ additional knowledge to request decomposed actuation tasks that are more concrete than the actuation task being monitored. For example actuation tasks that refer to a physical actuator rather than a location.

According to a preferred embodiment an actuator resource may control at least two physical actuators, wherein the actuator resource monitors an actuation request, wherein the actuator resource receives a notification ordering the actuation, and wherein the actuator resource employs additional knowledge in order to determine which actuator should be controlled.

According to a preferred embodiment an actuator resource may employ additional knowledge to decide whether the monitored actuation request requires actual control of the associated physical actuator.

With respect to coordination and conflict resolution, notifications about the actuation status information can be employed for simple coordination in order to avoid conflicts. Advantageously, it may be provided that before a resource user sends an actuation request, the resource user subscribes or queries the relevant parts in the actuation space, wherein a response of the actuation space indicates whether another actuator resource is already requesting a potentially conflicting actuation task. The resource then may decide whether it
1. does not send an actuation task in order to avoid conflicts or specify unnecessary tasks, for example there is no need to turn on light if it is already turned on
2. modifies its original actuation task in a non-conflicting way, e.g. by changing the spatial scope
3. sends a potentially conflicting request In the third case other resources must solve these conflicts. Three methods are proposed:
1. Actuation resources resolve all conflicts
2. Conflict resolution resources resolve conflicts
3. Combination of 1. and 2.: Actuator resources can combine their own conflict resolution strategy with resolved requests provided by a conflict resolution resources, using it as a suggestion Advantageously, a conflict resolution resource may be provided in case of an actuator resource sends a conflicting actuation request, wherein the conflict resolution resource resolves the conflict by monitoring the actuation space and providing a resolved actuation request being accordingly marked. Thus, actuator resources can then subscribe to the resolved request, knowing that they do not have to deal with any conflicts.

Advantageously, a conflict resolution mechanism is provided, wherein the conflict resolution mechanism includes first-in-first-out, overwrite, prioritize and/or task modification mechanisms. In doing so, first-in-first-out means that actuation requests are queued and executed in the order they come in, if they contain temporal constraints they are discarded. This may use the lock element optionally contained in the actuation status as described above. Overwrite means that currently executed actuation tasks are simply overwritten by incoming requests. Prioritize means that depending on access policies certain resource users can have priorities over other resource users. This can be implemented as prioritized queue or selective overwrite. The task modification means that in certain cases it may be possible to resolve conflicts by modifying conflicting tasks. Actuator resource would update the actuation status and conflict resolution resources would update the resolved actuation task.

Conflicts may also occur on the actuator side: if two actuator resources that control individual robots, subscribe to an actuation task "open the door", then they can coordinate by checking the actuation status before executing the actuation task. The same coordination mechanism may be useful for saving energy.

It is noted that one important advantage of a method or system according to the present invention compared to known systems and methods is the fact that actuation tasks and status information are explicitly represented in the system and made accessible to external entities. For instance resource users can subscribe to the actuation space using the same mechanisms an actuator resource does. In contrast to the actuator resource users are mainly interested in the status results related to a specific actuation task. In a preferred embodiment the subscription is specified using the CALA query language specified in Strohbach et al., "A case for IMS—Harvesting the Power of Ubiquitous Sensor Networks", in IEEE Vehicular Technologies Magazine, Vol. 4 (1), March 2009, pp. 57-64, in which constraints can be defined to select the corresponding attributes in the actuation space which could also be designated as actuator model.

According to a preferred embodiment the actuation space comprises at least one actuation space resource that manages fragments of the actuation space, a resolver that receives all requests that modify the actuation space, and at least one resource directory employed by the resolver, wherein the at least one resource directory returns the correct actuation space resource to the resolver, wherein the resolver forwards the original actuation request received by an resource user or an actuator resource to the actuation space resource.

Advantageously, the at least one resource user and the at least one actuator resource interact directly with an actuation space resource and a resource directory.

According to a preferred embodiment an actuator resource implements a native legacy interface for a legacy actuator, wherein the native legacy interface intercepts calls from legacy resource users, wherein the calls are forwarded to the legacy actuator resource, and wherein a corresponding actuation request is inserted in the actuation space allowing further resource users to coordinate on the actuation tasks of the actuation request.

Important aspects of the present invention together with preferred embodiments are:
   Resource users decoupled from actuator resources both in space and time
   Resource users don't need to communicate with actuator resources directly
   Actuation requests can relate to physical actuators or more other physical entities (e.g. room)
   Explicit actuation status information facilitates coordination and conflict resolution
   Support for heterogeneous actuators and actuator services
   Task oriented programming abstraction easing the development of applications
   Simple integration with legacy actuators
Direct Physical Effects:
   Actuations meet the expectations of end-users (less oscillation)
   End-users do not need to control individual physical actuators but can operate whole environments
   End-users can indirectly control actuators that are not known at the time the actuation is requested (e.g. "turn on light in room" does not require knowledge about the individual light actuators in the room)

Plug and Play behaviour: newly added actuators can directly be used without requiring a new actuation request or modifications thereof, i.e. they instantly react to previously specified actuation requests Actuation in an environment relative to a moving physical entity can be achieved without additional user involvement Important advantages of the present invention are:

Decoupling between controlling resource users and controlled actuators

Unified mechanisms and interfaces

Figure 2:
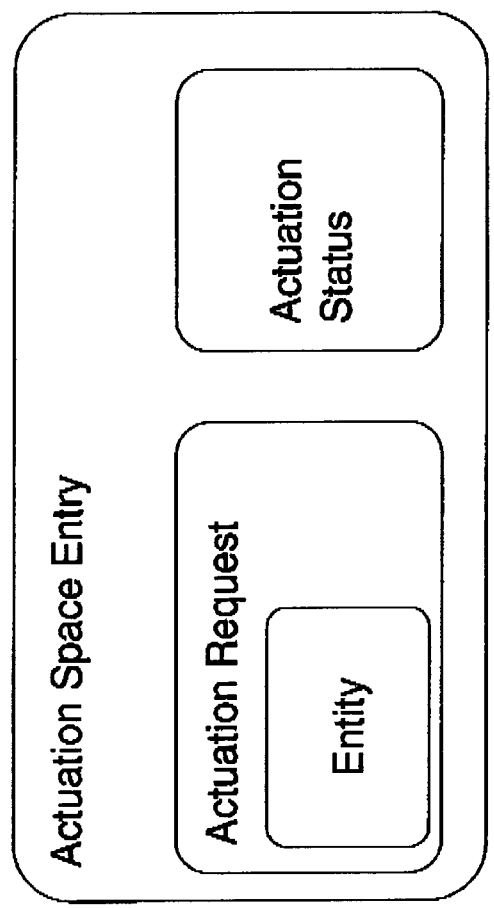
Figure 3:
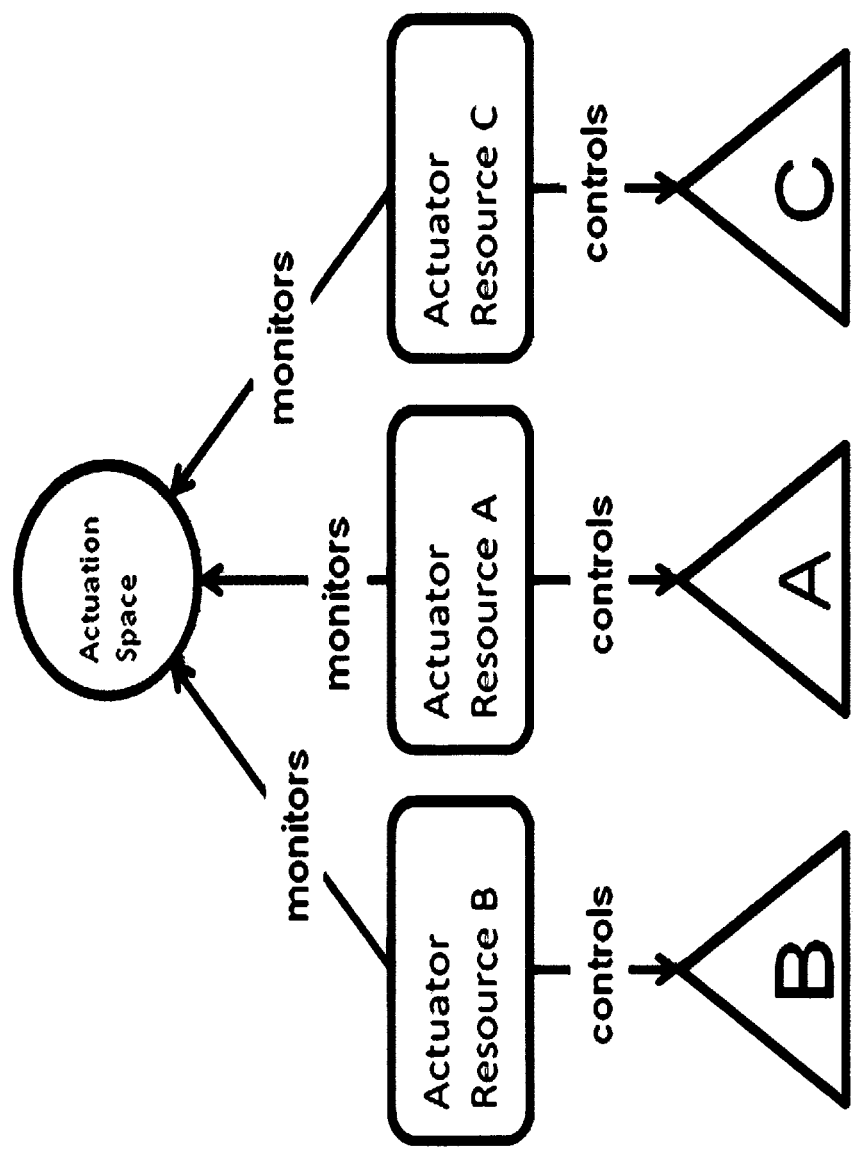
Figure 4:
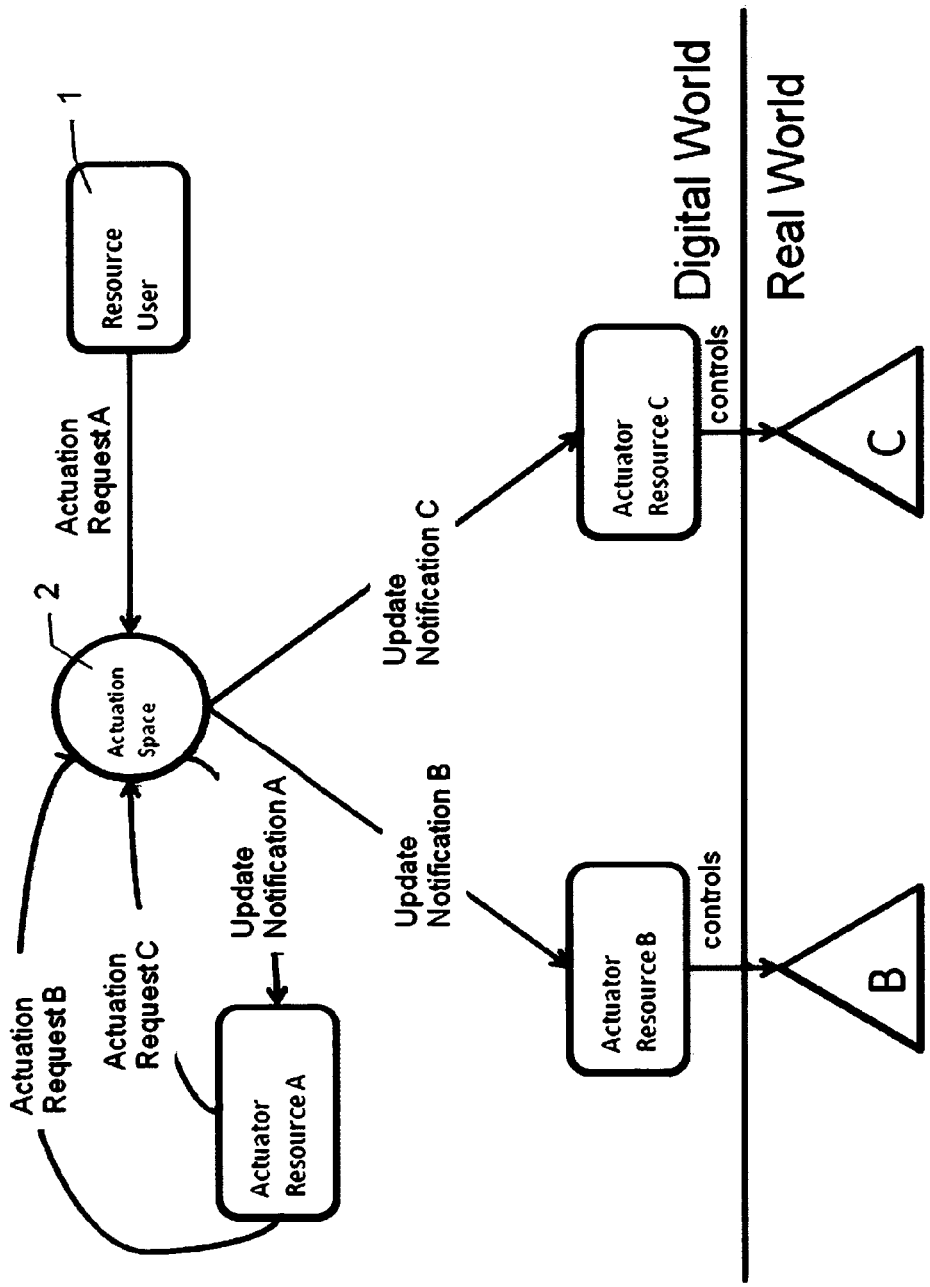
Figure 5:
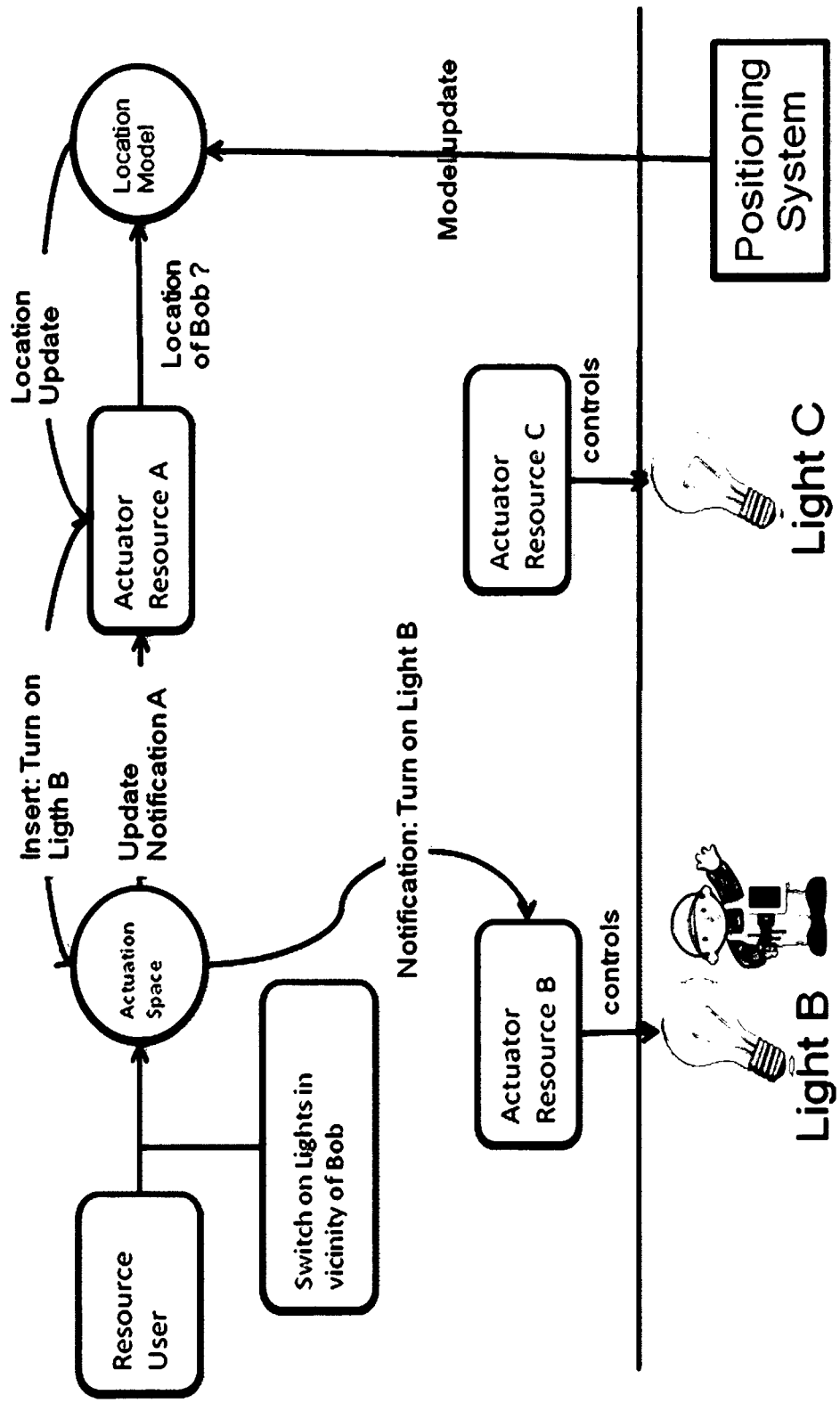
Figure 6:
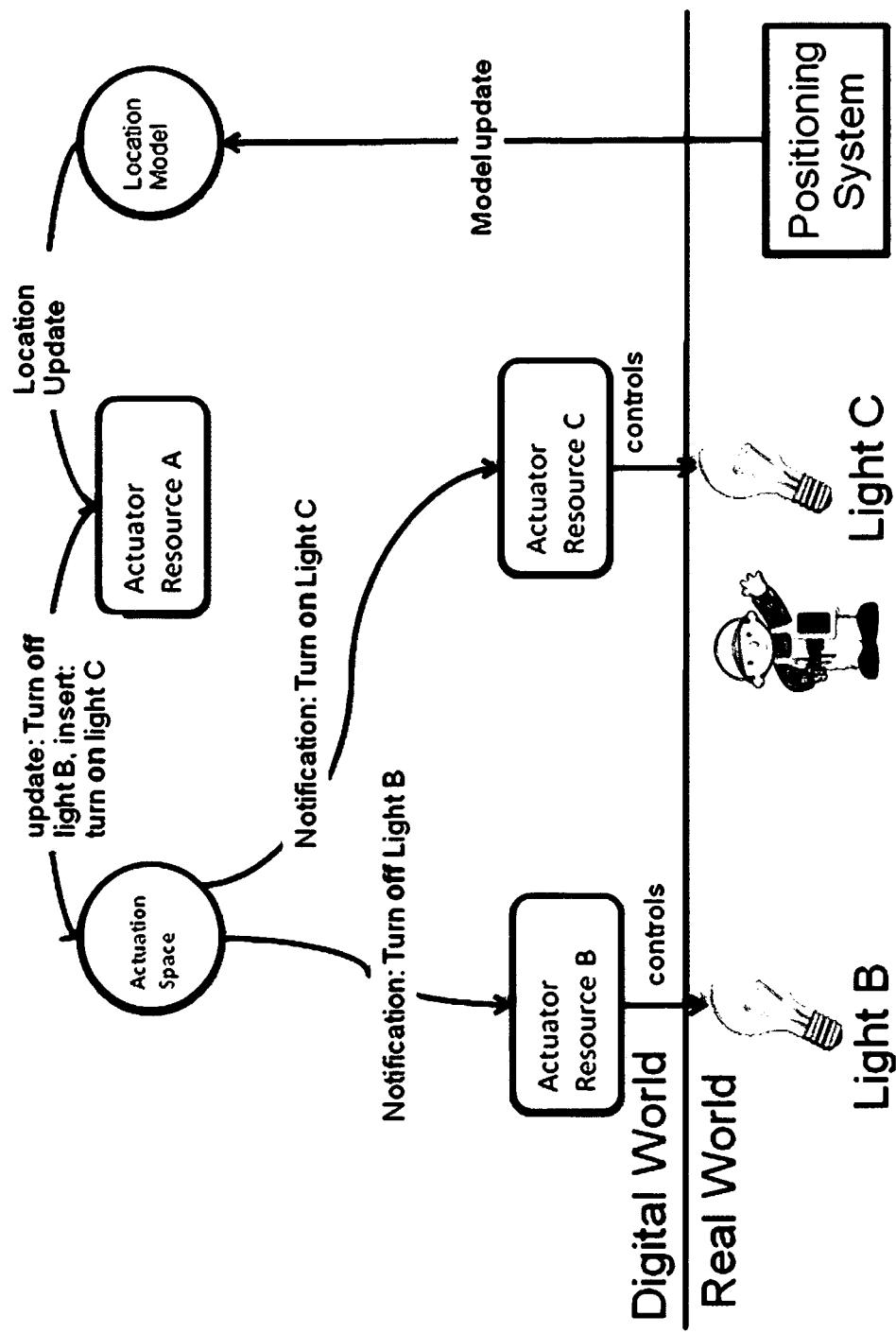
Figure 7:
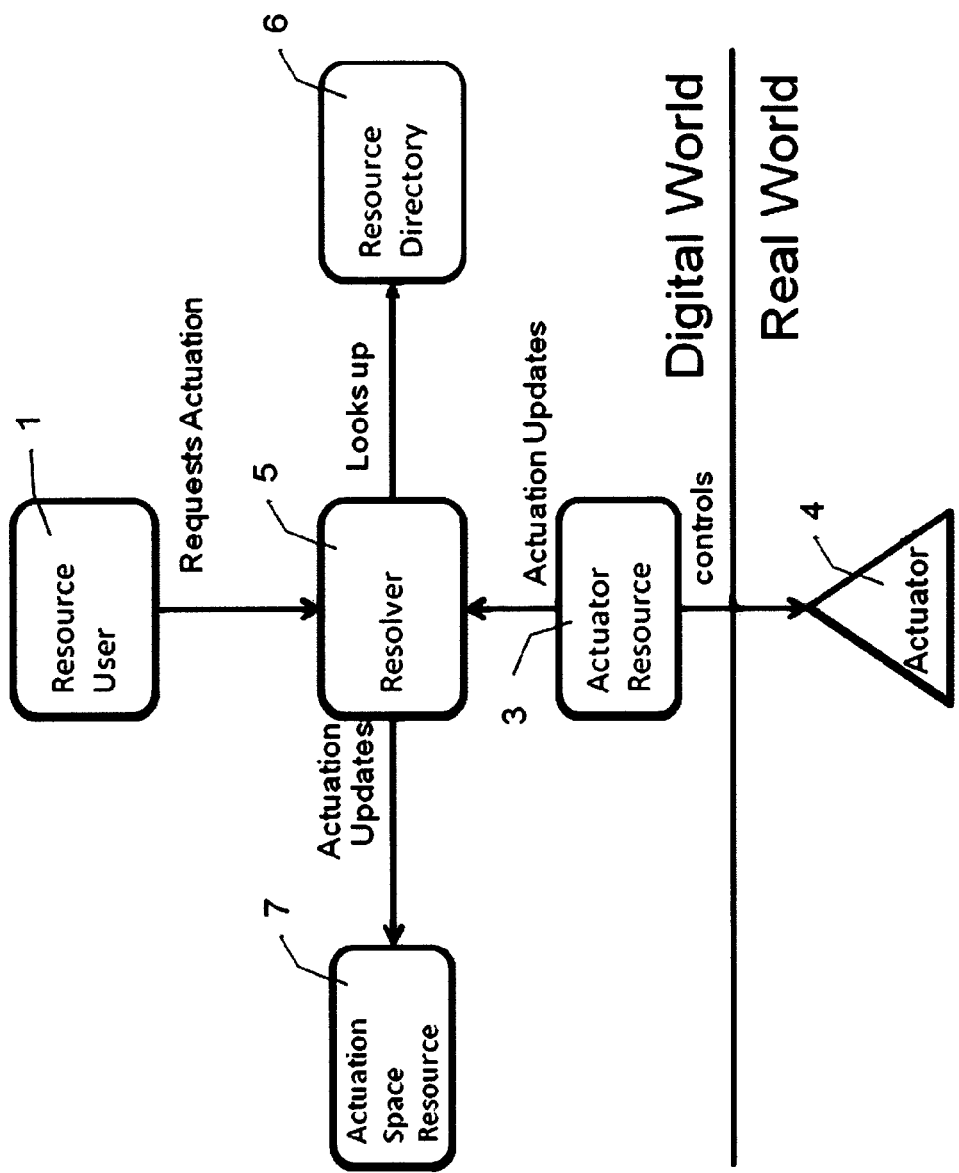
Figure 8:
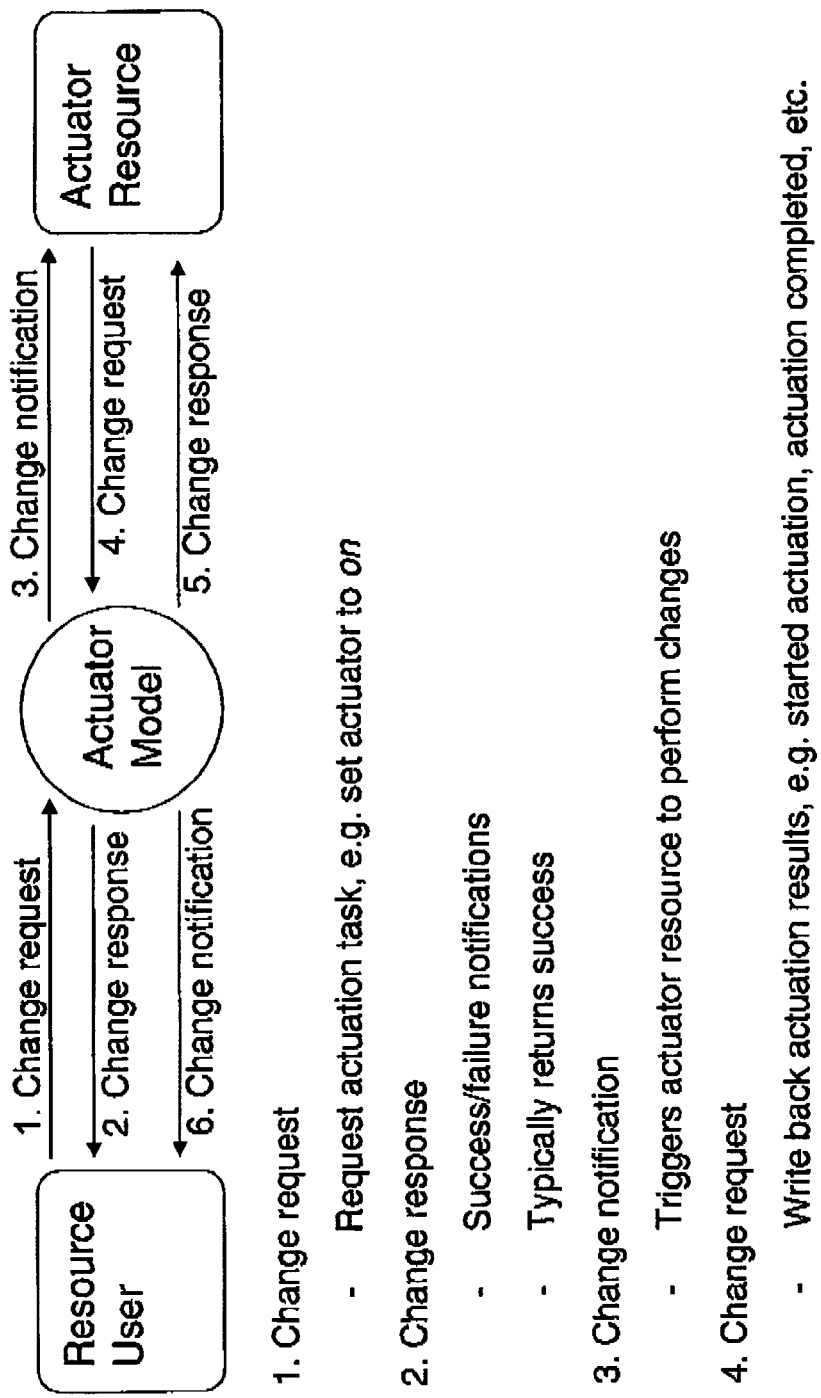
Figure 9:
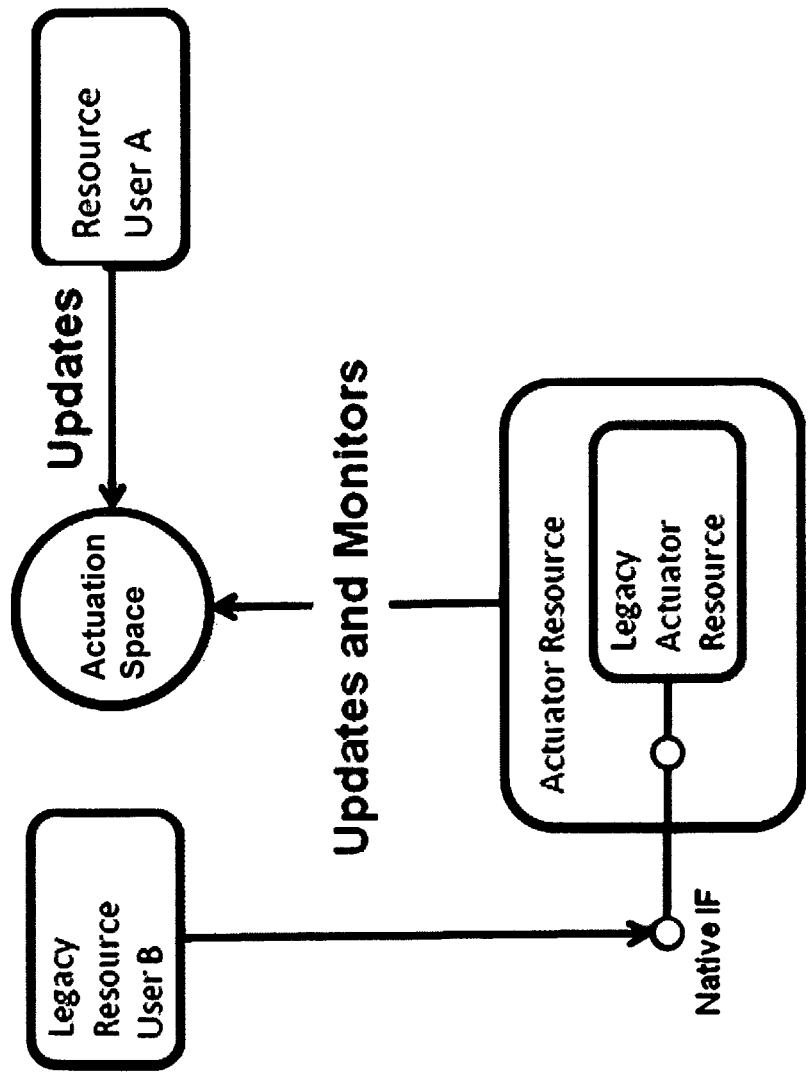

Support for conflict resolution and coordination
1. between resource users
2. between actuator resources Dynamic Binding of actuators to actuation requests Entity-based actuation tasks Plug and Play behaviour There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained. In the drawing FIG. 1 is a schematic overview of an example of an application scenario of a method or system according to the present invention illustrating the basic principle regarding the interaction between the individual entities, FIG. 2 is a schematic view illustrating an actuation space entry according to an embodiment of the present invention, FIG. 3 is a schematic overview of an exemplary application scenario of an embodiment of a method or system according to the present invention illustrating the virtualization of concrete physical actuators, FIG. 4 is a schematic overview of an exemplary application scenario of an embodiment of a method or system according to the present invention illustrating the execution of an actuation request by composing several physical actuators, FIG. 5 is a schematic overview of an exemplary application scenario of an embodiment of a method or system according to the present invention illustrating dynamic composition which is a variant of dynamic actuator binding, FIG. 6 is a schematic overview illustrating the continuation of the exemplary application scenario of FIG. 5, FIG. 7 is a schematic overview illustrating a design of an actuation space according to an embodiment of the present invention, FIG. 8 is a sequence diagram illustrating basic interactions between actuation space and resource user or actuator resource according to an embodiment of the present invention, FIG. 9 is a schematic view illustrating the interaction with legacy actuators according to an embodiment of the present invention.

FIG. 1 shows a schematic overview illustrating an application scenario of a method or system according to the present invention. FIG. 1 illustrates the basic principle regarding the interaction between the following individual entities that are depicted in FIG. 1:

Actuation Space 2: An entity that decouples resource users from actuator resources. The actuation space 2 manages actuation requests and actuation status information. The actuation space 2 provides both a high level abstraction for physical actuators and dynamic mapping of concrete physical actuators. The actuation space 2 is implemented in a distributed fashion, e.g. in a hierarchy of actuation subspaces that manage actuation information for certain geographic areas, such as a dedicated building.

Resource User 1: An entity that sends actuation requests to the system specifying the effects. The resource users can also subscribe to the information managed in the actuation space 2 in order to avoid conflicts and coordinate with other resource users. The resource user 1 only needs to interact with the actuation space 2 and not with any concrete actuator resource.

Actuator Resource 3: An entity that directly or indirectly controls at least one physical actuator 4 based on actuation requests stored in the actuation space. Actuator resources can also act as a resource user and this way indirectly control physical actuators. The actuator resource subscribes to at least one actuation request managed by the actuation space 2 and updates the actuation status in the actuation space 2. In order to control a physical actuator 4 an actuator resource 3 only needs to interact with the actuation space 2 and not with the resource user 1.

Actuator 4: An entity that is software controllable and has a measurable effect on the physical environment. Examples of actuators are buzzers, vibrating elements, thermostats, heating/cooling elements, motors or servomotors, speakers, electronic displays, LEDs, robots or parts of robots or sprinkler systems. The actuators are controlled by actutator resources.

The method illustrated in FIG. 1 comprises the following minimal and temporally independent steps:

Update, insertion or deletion of an actuation request in the actuation space by a resource user. Updates modify existing actuation requests, insertions add new actuation requests, and deletions remove existing actuation requests.

Monitoring actuation status and actuation requests by a resource user. Independently of an actuation request, resource users monitor to actuation information maintained in the actuation space for coordinated actuator control. Resource users subscribe to information in the actuation space or poll the actuation space by sending queries.

Monitoring of at least one actuation request and actuation status by an actuator resource. Actuator resources monitor information in the actuation space by sending corresponding requests to the actuation space. These requests contain a description of the actuation request and a flag indicating whether status information should be returned if available. These requests are temporally completely decoupled from the update of an actuation request. Actuator resources can start monitoring the information long before any resource user actually requests an actuation task. This way a new actuation request can instantly be executed by an actuator resource. Likewise a newly deployed actuator resource may monitor the actuation space long after the resource user has requested an actuation task. By doing this, new actuators can dynamically be taken into account. The monitoring is performed by sending subscriptions as requests. As a result of the subscription an initial notification is returned containing the actuation request and status information if requested by the actuator resource. The notification may be empty if there is no corresponding request. Alternatively, actuator resources can poll the actuation space by sending queries.

Execution of the actuation request and update of the actuation status and actuation request in the actuation space by the actuator resource. An actuator resource executes the actuation request after receiving a notification which is a result of an update operation of a resource user. It also updates the corresponding status information. Additionally it can also update the actuation request in order to resolve conflicts.

FIG. 2 is a schematic view illustrating an actuation space entry according to an embodiment of the present invention. The actuation space contains individual entries with the following two main elements: Actuation requests specifying requests for a certain actuator and actuation status providing information about the status of the actuation request. The actuation request depicted in FIG. 2 refers to a physical entity. Such an entity can be a physical actuator or any other real-world physical entity such as a room.

FIG. 3 is a schematic overview of an exemplary application scenario of an embodiment of a method or system according to the present invention illustrating the virtualization of concrete physical actuators. Each actuation request in the actuation space refers to a virtual actuator. The binding to concrete physical actuators is achieved by actuator resources that monitor respective actuation requests. FIG. 3 shows how multiple actuators can be controlled by monitoring only one actuation request. Originally there may only be on actuator resource A that reacts to changes in the actuation space, but as actuators B and C with their corresponding resources are deployed they can subscribe to the same actuation model/actuation space without the resource user having to know about these actuators. This has the benefits that actuators are easily replaceable and the desired effect as specified in the actuation task can be maximized as new actuators are deployed at runtime without changing anything in the existing system.

FIG. 4 illustrates a schematic overview of an exemplary application scenario of an embodiment of a method or system according to the present invention. The method or system according to the embodiment depicted in FIG. 4—actuator composition method—can be used to execute an actuation request by composing several physical actuators. Thereby the method or system is used for realizing entity-based actuation tasks. FIG. 4 shows how a single actuation request can control multiple actuators by composing actuator resources and their corresponding actuators. The actuation request originating from the resource user 1 is received by the actuator resource A that has previously subscribed to this request. Actuator resource A does not directly control an actuator, but knows that in order to satisfy the original actuation request additional actuation tasks must be executed. As actuator resource A does not know about actuator resources B and C, it breaks down the original actuation request in two separate actuation requests inserting them in the actuation space 2 using the same mechanism as the resource user 1. Finally, actuator resources B and C receive the corresponding notifications controlling their respective actuators. For instance one may specify to set the brightness in a room to the maximum level. Actuator resource A would know all the light sources fixed in the room, but does not have any knowledge about mobile light sources, e.g. mobile phones.

FIG. 5 is a schematic overview of an exemplary application scenario of an embodiment of a method or system according to the present invention illustrating dynamic composition which is a variant of dynamic actuator binding, The embodiment of the method for dynamic actuator binding is a method for decoupled actuator control in which actuators are dynamically bound to physical actuators. This method realizes conditional tasks and is described as follows:

An actuator resource monitors an actuation request in the actuation space

An actuator resource uses additional knowledge for making decisions about which actuator to control. Additional knowledge may be obtained from knowledge encapsulated in the actuators and/or by accessing an external system (e.g. sensing system, knowledge base or any other systems or third party services)

In contrast to the embodiment of the method of FIG. 4 in which actuators are composed statically, the embodiment of the method for dynamic actuator binding allows a resource user to specify a high level actuation task that requires the dynamic selection of relevant actuators. The resource user can abstract from the concrete actuators as actuation space decouples the resource users from concrete actuator resources that execute the actuation task.

FIG. 5 shows a concrete example illustrating a variant of dynamic actuator binding—dynamic composition method—in which the dynamic selection of actuators is achieved by an actuator resource A that encapsulates knowledge about which actuation tasks have to be performed based on sensed information. Actuator resource A picks up the actuation task requested by the resource users. Once actuator resource A receives the corresponding notification, it subscribes to location information. Based on the location updates actuator resource A receives, it chooses the correct actuator by inserting a corresponding actuation request in the actuation space. This request is in turn picked up by actuator resource B that controls a corresponding light. Actuator resource A does not know about concrete actuator resources B and C. Actuator resource A only specifies that light bulb B (or C) should be turned on or off. This is achieved with the actuation space that decouples the actuator resource A from actuator resources B and C.

FIG. 6 is a schematic overview illustrating the continuation of the exemplary application scenario depicted in FIG. 5. FIG. 6 shows the messages after the user Bob moves away from light B and into the vicinity of light C. The movement of user Bob causes a location update being sent to actuator resource A. As a result the actuator resource A updates the actuation space to turn off light B and turn on light C. The resource user is omitted from this drawing as in this example it does not interact with the actuation space any more.

A further variant of dynamic actuator binding is the dynamic actuator selection method that assumes that an actuator resource controls at least two physical actuators. The dynamic actuator selection further refines the method for dynamic actuator binding as follows:

The actuator resource monitors an actuation request, the actuator resource receives a notification, and the actuator resource uses additional knowledge in order to determine which actuator should be controlled.

A further variant of dynamic actuator binding is the dynamic actuation decision method that further refines the method for dynamic actuator binding as follows:

An actuator resource uses additional knowledge to decide whether the monitored actuation request requires actual control of the associated physical actuator.

This dynamic actuation decision method achieves the same effect as the dynamic composition method. The dynamic actuation decision method encapsulates the knowledge in actuator resources that directly control physical actuators without having an additional actuator resource—actuator resource A in FIG. 5 and FIG. 6. With this dynamic actuation decision method actuator resources B and C in the exemplary application scenario of FIG. 5 and FIG. 6 would need to subscribe both to high level actuation task requested by the resource user. In addition both light bulb actuator resources subscribe to location updates and only modify the light status if the user Bob is in vicinity of the light bulb they are controlling.

In comparison to the dynamic composition example of FIG. 5 and FIG. 6 the dynamic actuation decision method has the advantage that more dynamic behaviour can be directly coupled with a physical actuator. In the dynamic composition method of FIG. 5 and FIG. 6 actuator resource A does not control directly a physical actuator and therefore depends on actuator resource B and C of FIG. 5 and FIG. 6.

The advantage of the dynamic composition method illustrated in FIG. 5 and FIG. 6 is that it causes less traffic—only one subscription to position information—and that it can provide advanced actuator control based on basic actuator control functionalities.

FIG. 7 is a schematic overview illustrating a design of an actuation space according to an embodiment of the present invention. In the embodiment depicted in FIG. 7 the actuation space is implemented with at least one actuation space resource 7 that manages fragments of the overall actuation space, e.g. actuation requests relating to a certain physical location or entity such as a building. In the embodiment depicted in FIG. 7 a resolver 5 receives all requests that modify the actuation space. The resolver 5 uses at least one resource directory 6 that returns the correct actuation space resource 7. The resolver 5 then forwards the original request received by a resource user 1 or actuator resource 3 to that actuation space resource 7.

It is noted that in other embodiments the resource user may directly interact with actuation space resources and resource directories. The same applies for actuator resources.

The actuation space can be implemented as follows:
1. An independent actuation resource that is monitored by one or multiple actuator resources.
2. Distributed across several actuation space resources. The actuation space can consist of hierarchical actuation space resources that manage actuation request for a certain physical area such as a building. They can be further partitioned according to types of actuation requests or actuators.
3. An actuation space resource that is collocated with an actuator resource. This variant facilitates simpler deployment for simple actuation environments while providing the flexibility to add other actuator resources that monitor the same actuation requests.

FIG. 8 is a sequence diagram illustrating basic interactions between actuation space and resource user or actuator resource according to an embodiment of the present invention. FIG. 8 visualizes an embodiment in which the resource users know that the actuation space or the actuator model does not use a resolver and a resource directory. FIG. 8 shows the following interactions:
1. Change Request: Request actuation task, e.g. set actuator to on
2. Change Response: Success/failure notifications; Typically returns success
3. Change notification: Triggers actuator resource to perform changes
4. Change request: Write back actuation results, e.g. started actuation, actuation completed, etc.
5. Change response
6. Change notification: Notification about changes as of step 4.

Moreover, according to the embodiment illustrated in FIG. 8, a synchronous and/or an asynchronous actuation can be performed:
Synchronous Actuation
  Resource User (RU) executes a single request/response operation
  Option A: Request=Request 1., Response=Response 2.
  Option B: Request=Request 1., Response=Response 2.+3.
  Actuation results can be obtained by querying the actuation model once or periodically
Asynchronous Actuation
  RU executes model change request and subscribes to model changes
  RU subscribes to model changes related to actuation results
  Option A: include subscription in request 1.
  Option B: subscribe separately if interested FIG. 9 is a schematic view illustrating the interaction with legacy actuators according to an embodiment of the present invention. The method or system according to the present invention requires to implement a query and/or subscription interface along with an implementation that interprets corresponding actuation requests. Legacy actuators may not provide such an implementation. FIG. 9 shows how a seamless integration of any legacy actuators is enabled. Resource user B is a legacy resource user that can only use the legacy interface. Resource user A is a resource user according to the present invention.

FIG. 9 illustrates that an actuator resource implements a native legacy interface Native IF of the actuator intercepting calls by legacy resource user B. Such calls are forwarded to the legacy actuator resource and a corresponding actuation request is inserted in the actuation space allowing resource user A to coordinate on the actuation tasks with the method according to the present invention.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling physical actuators in pervasive computing environments: comprising:
    providing an actuation space entity that implements an actuation space configured to manage actuation requests and actuation status information the actuation status information providing information about a status of the actuation requests;
    sending one or more actuation requests from a resource user entity to said actuation space;
    storing, at said actuation space, said one or more actuation requests;
    controlling, via at least one actuator resource entity, at least one physical actuator on a basis of one or more of said actuation requests stored in said actuation space;
    sending, from said at least one actuator resource entity, actuation status information corresponding to one or more of said actuation requests to said actuation space, wherein said at least one resource user entity and said at least one actuator resource entity share said actuation space of said actuation space entity, wherein a monitoring of said actuation requests and/or actuation status information maintained in said actuation space is performed by subscribing to said actuation requests and/or actuation status information, wherein said subscribing is performed by sending subscription requests to said actuation space, said subscription requests including any of a description of the actuation request and a flag indicating whether actuation status information is to be returned if available, wherein said actuation space comprises
- at least one actuation space resource that manages fragments of the actuation space,
- a resolver that receives all requests that modify the actuation space, and
- at least one resource directory employed by said resolver, wherein said at least one resource directory returns the correct actuation space resource to said resolver, wherein said resolver forwards the original actuation request received by an resource user entity or an actuator resource entity to said actuation space resource, wherein an actuator resource entity implements a native legacy interface for a legacy actuator, wherein said native legacy interface intercepts calls from legacy resource user entities, wherein said calls are forwarded to a legacy actuator resource entity, and wherein a corresponding actuation request is inserted in said actuation space allowing further resource user entities to coordinate on the actuation tasks of said actuation request.

2. The method according to claim 1, wherein said at least one resource user entity and said at least one actuator resource entity are decoupled, spatially and/or temporally, by updating and accessing said shared actuation space.

3. The method according to claim 1, wherein updates, insertions and/or deletions of actuation requests in said actuation space are performed by said at least one resource user entity.

4. The method according to claim 1, wherein at least one resource user entity monitors at least one of said actuation requests and/or actuation status information maintained in said actuation space.

5. The method according to claim 1, wherein at least one actuator resource entity monitors at least one of said actuation requests and/or actuation status information maintained in said actuation space.

6. The method according to claim 1, wherein a monitoring of said actuation requests and/or actuation status information maintained in said actuation space is performed by polling said actuation space.

7. The method according to claim 1, wherein said at least one resource user entity and said at least one actuator resource entity are notified about changes in said actuation space by said actuation space or another entity being aware of changes in said actuation space.

8. The method according to claim 1, wherein said at least one actuator resource entity executes an actuation request after receiving a notification from said actuation space as a result of a change in said actuation space that is performed by said at least one resource user entity.

9. The method according to claim 1, wherein said at least one actuator resource entity updates said actuation requests and said corresponding actuation status information in said actuation space after an execution of said actuation requests.

10. The method according to claim 1, wherein said at least one or at least one actuator resource entity is operational to function as resource user entity in order to indirectly control at least one physical actuator.

11. The method according to claim 1, wherein said actuation space is implemented in a distributed fashion in a hierarchy of actuation subspaces that manage said actuation requests and actuation status information for different and/or predefined geographic areas.

12. The method according to claim 1, wherein said actuation space contains individual entries including an actuation request that specifies a request for a predefined actuator and an actuation status information that provides information about a status of said actuation request.

13. The method according to claim 1, wherein said actuation requests consist of actuation tasks and associated meta data that specify what physical effects are achieved in specified environments.

14. The method according to claim 1, wherein said actuation tasks are entity-based, wherein said entity-based actuation tasks specify actuation effects in relationship to a physical entity.

15. The method according to claim 1, wherein said actuation tasks are conditional, said conditional actuation tasks employing event-based rules that determine when an actuation request is to be executed.

16. The method according to claim 1, wherein said actuation tasks include temporal information about a planned and/or predefined time of execution.

17. The method according to claim 1, wherein said actuation tasks include permissible deviations, said deviations including an error and/or spatial tolerance.

18. The method according to claim 1, wherein said actuation tasks are composed, said composed actuation tasks defining temporal constraints and relationships between actuation tasks.

19. The method according to claim 1, wherein said actuation status information corresponding to an actuation request include a list of actuator resource entities taking care of said corresponding actuation request and the resource user entity that specified said actuation request.

20. The method according to claim 1,
wherein information stored in said actuation space is implemented with an entity-attribute based data model in which actuation tasks are specified in terms of effects on real-world entities, and
wherein actuation task and actuation status information are represented as different attributes of said entities.

21. The method according to claim 1,
wherein multiple physical actuators are controlled by monitoring a single actuation request of a resource user entity,
wherein an actuator resource entity reacts to changes regarding said actuation request in said actuation space, and
wherein further actuation resources being deployed subscribe to said actuation request unbeknown to said resource user entity.

22. The method according to claim 1,
wherein multiple physical actuators are controlled by composing actuator resource entities,
wherein an actuation request originating from an resource user entity is received by an actuator resource entity having previously monitored said actuation request, wherein said actuator resource entity breaks down said actuation request in new separated actuation requests and inserts said new separated actuation requests in said actuation space, and wherein further actuator resource entities are correspondingly notified to control their respective physical actuators according to said new separated actuation requests.

23. The method according to claim 1, wherein an actuator resource entity monitors an actuation request in said actuation space, wherein said actuator resource entity employs additional knowledge for making decisions about which physical actuator to control, and wherein said additional knowledge is obtained from knowledge encapsulated in said physical actuators and/or by accessing an external system.

24. The method according to claim 1, wherein said actuator resource entities employ additional knowledge to request decomposed actuation tasks that are more concrete than an actuation task being monitored.

25. The method according to claim 1, wherein an actuator resource entity controls at least two physical actuators, wherein said actuator resource entity monitors an actuation request, wherein said actuator resource entity receives a notification ordering the actuation, and wherein said actuator resource entity employs additional knowledge in order to determine which actuator is to be controlled.

26. The method according to claim 1, wherein an actuator resource entity employs additional knowledge to decide whether the monitored actuation request requires actual control of the associated physical actuator.

27. The method according to claim 1, wherein before a resource user entity sends an actuation request, wherein said resource user entity subscribes or queries relevant parts in said actuation space, and wherein a response of said actuation space indicates whether another actuator resource entity is already requesting a potentially conflicting actuation task.

28. The method according to claim 1, wherein a conflict resolution resource is provided in case of an actuator resource entity sends a conflicting actuation request, and wherein said conflict resolution resource resolves a conflict by monitoring said actuation space and providing a resolved actuation request being accordingly marked.

29. The method according to claim 1, wherein a conflict resolution mechanism is provided, wherein said conflict resolution mechanism includes any of first-in-first-out, overwrite, prioritize and task modification mechanisms.

30. The method according to claim 1, wherein said at least one resource user entity and said at least one actuator resource entity interact directly with an actuation space resource and a resource directory.

31. A system for controlling physical actuators in pervasive computing environments, in particular for the execution of the method according to claim 1, the system comprising:

an actuation space entity, that implements an actuation space, being configured to manage actuation requests and actuation status information, wherein the actuation status information provides information about a status of the actuation requests;

at least one resource user entity being configured to send one or more actuation requests to said actuation space entity that stores said one or more actuation requests; and at least one actuator resource entity being configured to control at least one physical actuator on a basis of one or more of said actuation requests stored in said actuation space, said at least one actuator resource entity further being configured to send actuation status information corresponding to one or more of said actuation requests to said actuation space of said actuation space entity, and said at least one resource user entity and said at least one actuator resource entity being configured to share said actuation space of said actuation space entity, wherein a monitoring of said actuation requests and/or actuation status information maintained in said actuation space is performed by subscribing to said actuation requests and/or actuation status information, wherein said subscribing is performed by sending subscription requests to said actuation space, said subscription requests including any of a description of the actuation request and a flag indicating whether actuation status information is to be returned if available, wherein said actuation space comprises
at least one actuation space resource that manages fragments of the actuation space,
a resolver that receives all requests that modify the actuation space, and
at least one resource directory employed by said resolver, wherein said at least one resource directory returns the correct actuation space resource to said resolver, wherein said resolver forwards the original actuation request received by an resource user entity or an actuator resource entity to said actuation space resource, wherein an actuator resource entity implements a native legacy interface for a legacy actuator, wherein said native legacy interface intercepts calls from legacy resource user entities, wherein said calls are forwarded to a legacy actuator resource entity, and wherein a corresponding actuation request is inserted in said actuation space allowing further resource user entities to coordinate on the actuation tasks of said actuation request.

* * * * *